United States Patent
Mayrack et al.

(10) Patent No.: US 12,353,922 B2
(45) Date of Patent: Jul. 8, 2025

(54) AUTOMATIC QUERY ROUTING

(71) Applicant: Teradata US, Inc., Englewood, OH (US)

(72) Inventors: John Jeffrey Mayrack, Minneapolis, MN (US); Sriram K. Somayajula, Cerritos, CA (US); Thomas Julien, San Marcos, CA (US); John Chapra, Encinitas, CA (US); John Lawrence Perkins, Jr., Escondido, CA (US)

(73) Assignee: Teradata US, Inc., San Diego, CA (US)

( * ) Notice: Subject to any disclaimer, the term of this patent is extended or adjusted under 35 U.S.C. 154(b) by 194 days.

(21) Appl. No.: 16/527,190

(22) Filed: Jul. 31, 2019

(65) Prior Publication Data
US 2021/0034433 A1 Feb. 4, 2021

(51) Int. Cl.
*G06F 9/50* (2006.01)
*G06F 16/2455* (2019.01)
*G06F 16/2458* (2019.01)

(52) U.S. Cl.
CPC ............ *G06F 9/5083* (2013.01); *G06F 9/505* (2013.01); *G06F 16/2455* (2019.01); *G06F 16/2471* (2019.01)

(58) Field of Classification Search
None
See application file for complete search history.

(56) References Cited

U.S. PATENT DOCUMENTS

| | | | |
|---|---|---|---|
| 6,694,306 B1 | 2/2004 | Nishizawa et al. | |
| 7,209,915 B1* | 4/2007 | Taboada | G06F 16/951 707/755 |
| 7,370,064 B2* | 5/2008 | Yousefi'zadeh | G06F 16/2471 |
| 7,532,532 B2* | 5/2009 | Schreck | G11C 11/40615 365/185.25 |
| 8,112,443 B2* | 2/2012 | Hutchison | G06F 16/2471 707/782 |
| 8,890,496 B2 | 11/2014 | Inoue et al. | |
| 10,268,704 B1* | 4/2019 | Sanderson | G06F 16/278 |
| 10,339,147 B1* | 7/2019 | Barmes | G06N 5/046 |
| 10,528,599 B1* | 1/2020 | Pandis | G06F 16/2455 |
| 10,783,076 B1* | 9/2020 | McConnell | G06F 16/24552 |
| 11,070,628 B1* | 7/2021 | Memon | G06F 3/0664 |
| 2007/0192328 A1* | 8/2007 | Handa | G06F 16/2471 |
| 2008/0228778 A1* | 9/2008 | Mabachi | G06F 16/24532 |
| 2008/0319967 A1* | 12/2008 | Hutchison | G06F 16/2471 |
| 2009/0037367 A1* | 2/2009 | Wein | G06F 9/5061 |
| 2011/0219023 A1* | 9/2011 | Ambrose | G06F 16/9574 707/769 |

(Continued)

*Primary Examiner* — Abu Zar Ghaffari
(74) *Attorney, Agent, or Firm* — Randy L. Campbell, Jr.

(57) ABSTRACT

A data request that references an external data environment object (foreign object) is identified. A Data Manipulation Language (DML) statement for accessing the object is traversed in a defined order to identify foreign servers having the foreign object. Connections are attempted to foreign servers in the defined order and a selection to one of the foreign servers is made based on server and/or data conditions. The selected server is used for the request to process the portion of the request that includes the foreign object. In an embodiment and during execution of data request, the server and/or the data conditions can be dynamically overridden to change selection criteria for the selected server.

17 Claims, 7 Drawing Sheets

(56) References Cited

U.S. PATENT DOCUMENTS

| | | | |
|---|---|---|---|
| 2012/0179720 A1* | 7/2012 | Seitz | G06F 16/24552 |
| | | | 707/E17.014 |
| 2012/0207306 A1* | 8/2012 | Candelore | H04L 67/10 |
| | | | 380/287 |
| 2014/0092805 A1* | 4/2014 | van de Ven | H04W 76/10 |
| | | | 370/328 |
| 2014/0317084 A1* | 10/2014 | Chaudhry | G06F 16/24552 |
| | | | 707/713 |
| 2015/0341367 A1* | 11/2015 | Kus | G06F 21/6218 |
| | | | 726/1 |
| 2016/0012097 A1* | 1/2016 | Lee | G06F 16/25 |
| | | | 707/690 |
| 2016/0077901 A1* | 3/2016 | Roth | G06F 8/315 |
| | | | 719/328 |
| 2017/0103094 A1* | 4/2017 | Hu | G06F 16/2272 |
| 2017/0149870 A1* | 5/2017 | Arnold | H04L 43/0852 |
| 2018/0025053 A1* | 1/2018 | Sah | G06F 16/2453 |
| | | | 707/770 |
| 2018/0089259 A1* | 3/2018 | James | G06F 16/2282 |
| 2018/0089324 A1* | 3/2018 | Pal | G06F 9/546 |
| 2018/0157719 A1* | 6/2018 | Lin | G06F 16/2471 |
| 2018/0246942 A1* | 8/2018 | Chen | H04L 43/024 |
| 2019/0026335 A1* | 1/2019 | Gerweck | G06F 16/2457 |
| 2019/0147085 A1* | 5/2019 | Pal | G06F 16/24535 |
| | | | 707/718 |
| 2020/0073987 A1* | 3/2020 | Perumala | G06F 16/24545 |
| 2020/0311063 A1* | 10/2020 | Hariharasubrahmanian | |
| | | | G06F 16/24573 |
| 2020/0409949 A1* | 12/2020 | Saxena | G06F 9/505 |
| 2021/0294512 A1* | 9/2021 | Sun | G06F 3/0644 |

\* cited by examiner

AUTOMATIC QUERY ROUTING

BACKGROUND

As more and more companies move to an Analytic Ecosystem where the business data is hosted on systems in heterogeneous analytical environments, a single query may need to access the various environments to satisfy the request. Additionally, as the business importance of the Analytic Ecosystem continues to increase, many companies are going to need to rely on a robust Business Continuity Plan (BCP) to minimize and/or eliminate the impact of a portion of their ecosystem not being available.

All data queries are initiated from a specific source system. Portions of the query that need to go to systems for data other than the system where the query originated are called virtual queries. Some database providers support products for routing, data access, and data movement across different systems.

However, the products of these database providers only allow the portion of a query that needs to be routed to just a single external destination system. When the server associated with that single external destination system is not available, the query fails. In a failover situation (lack of availability of the external server) to ensure compliance with a given BCP, there must be manual intervention by a Database Administrator (DBA) to make the necessary changes to the external server definition associated with the query (e.g., to change the definition to a known available external server). Depending on the amount of time this manual change takes, the business capabilities would be impacted.

When all primary systems/servers are available during query execution processing for a query having an embedded portion associated with a virtual query, there is no concern. However, when one or more systems/servers is unavailable for any reason, current approaches in the industry result in the query failing triggering BCP concerns.

SUMMARY

In various embodiments, methods and a system for virtual query routing are provided.

In one aspect presented herein, a method for virtual query routing is provided. A data engine request is received for processing on a local data engine system. A portion of the data engine request is identified, the portion is to be processed externally from the local data engine system. A list of available external servers is obtained from a Data Definition Language (DDL) statement associated with the portion. Connections are attempted to one or more of the external servers from the local data engine system. A determination is made to select one of the external servers and the portion of the data engine request is processed using the selected external server.

DETAILED DESCRIPTION

Figure 1:
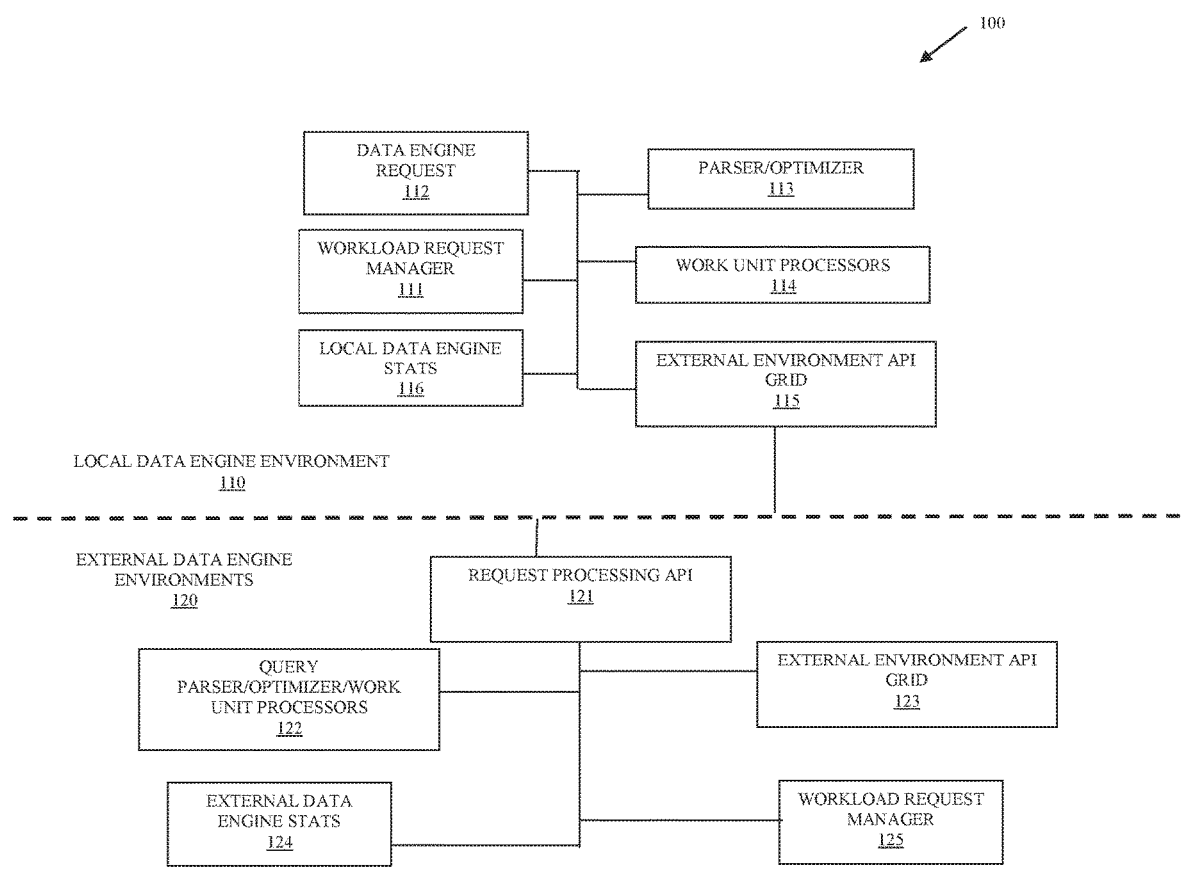
FIG. 1 is a diagram of a system for virtual query routing, according to an embodiment.

FIG. 1 is a diagram of a system 100 for virtual query processing, according to an embodiment. The system 100 is shown in greatly simplified form with just those components necessary for understanding the teachings of virtual query routing being illustrated. It is to be noted that a variety of other components or less components can be employed without departing for the teachings of virtual query routing presented herein and below.

The system 100 includes a local data engine environment 110 (local Data Engine Management System (DBMS 110). The local DBMS 110 includes data requests 112 (queries and other data engine operations), a workload request manager 111, a parser/optimizer 113, a plurality of Work Unit Processors (WUPs) 114, an external environment Application Programming Interface (API) grid 115, and local data engine (DB) statistics 116. The system 100 also includes one or more external DB environments (external DBMS) 120. The external DBMS 120 includes a request processing API 121, an equivalent to a parser/optimizer/WUPs 122 (herein after external query processing service 122), an external environment API grid 123, external DB statistics 124, and optionally one or more the external environments 120 may include their own workload request manager 125.

As used herein, the terms and phrases "data engine," and "data processing engine," may be used interchangeably and synonymously. The terms refer to interactions with data, which can include: databases, data warehouses that span multiple disparate databases, graph engines, general transformation to include graphs in use with machine learning/deep learning or proximity enabling, spherical systems such as geographical information system (GIS), and/or nested array systems.

As used herein "statistics" or "metrics" can include histograms (such as an equal height histogram and other types of histograms), min/max/mean values in the histograms, counts, sizes, approximation of blocks, superset/subset valuations or to estimate a curve amongst different histograms to predict confidence and accuracy based on actual values.

Reference to the terms "foreign," "external," "virtual," or "remote" refer to a processing environment that is not local to an initiating source or local environment. In this way, a virtual/foreign/external table is a table that is accessed during query processing from an environment that is not local to and is external to the originating query of a source environment.

It is to be noted, that a portion of a data engine request 112 (such as a query but may also be other data engine environment operations) associated with an external reference (e.g., virtual query) can be directed to an external table, external object, and/or external function controlled within the external data engine environment 120.

Furthermore, although only one set of components are illustrated in FIG. 1 for a single external data engine environment 120, there are more than one and at least two external data engine environments for purposes of the discussions herein. Each external data engine environment 120 may includes its own unique subset of the components illustrated. However, each external data environment minimally includes a requesting processing API 121 and an external/foreign table/function/object.

The local data engine environment 110 does not control and merely interfaces with the external data engine environments 120 the external environment API grid 115 with each external data environment's corresponding request processing API 121.

For purposes of the discussions that follow, the data engine request 112 is described as a data query that includes a nested virtual query (reference to a foreign table associated with one or more external data engine environments 120). It is to be noted that this does not always have to be the case as the request 112 can include any data access-based workload that is initiated on the local data engine environment 110. In this way, the request 112 may also be referred to as workload 112 herein and below.

Furthermore, the discussions that follow are described with the context of Structured Query Language (SQL) for a given request. However, the techniques presented herein may also be used within any Data Manipulation Language (DML) and is not exclusively limited to SQL.

Initially, a DML is extended to support extended operations, which are then recognized and processed in the manners discussed below.

These extensions include changes that include new parameters to existing DML constructions to support the virtual query routing provided herein and new DML constructs that are not native to and are new to the DML to support the virtual query routing provided herein.

For example, existing SQL supports use of a LINK definition within a context of a CREATE FOREIGN SERVER Data Definition Language (DDL) statement. This statement allows the details needed for locating and interacting with a foreign server of an external data engine environment 120. The existing DDL expects a single parameter for the LINK definition that provides the name of the foreign table/server to be defined.

The teachings herein extend this such that the LINK definition can include 2, 3, or more foreign table/servers to be defined for the CREATE FOREIGN DDL statement. The syntax for this extended LINK definition within the CREATE FOREIGN DDL statement is as follows:
CREATE FOREIGN SERVER QG_FS_With_Muft_ Routes
EXTERNAL SECURITY INVOKER TRUSTED QG-proxyUser USING LINK(ServerName='TD1',Seq=1, ServerName='TD1BCP',Seq=2, ServerName=TD3-Cold),Seq=3)
Route='SEQUENCE'
DO IMPORT WITH TD_SYSFNLIB.QGINITIATORIMPORT,
DO EXPORT WITH TD_SYSFNLIB.QGINITIATOREXPORT;

It is noted that the above CREATE FOREIGN DDL is presented as one example, such that the values presented are presented for purposes of illustration and it is to be understood that other values may be used.

The workload request manager 111 utilizes the CREATE FOREIGN DDL statement when processing the request 112 for purposes of identifying a foreign server that is available online and has the needed foreign table/object to satisfy the virtual query portion of the request 112. This selection processing can be achieved in three different manners herein: 1) selecting the first foreign server that is capable of being connected with (option 1 and illustrated in the FIG. 2), 2) selecting the foreign sever from multiple available foreign servers based on a lowest Central Processing Unit (CPU) usage available from the available foreign servers (option 2 and illustrated in the FIG. 3), and 3) selecting the foreign server from multiple available foreign servers based on costing any external data engine statistics 124 available from a workload request manager 125 of the external data engine environment 120 and selecting the lowest cost foreign server (option 3 and illustrated in the FIG. 4).

Continuing with the CREATE FOREIGN SERVER example statement, the underlined portion of the statement represents an extended LINK definition that takes multiple foreign servers, each include a sequence number ("Seq"). The value assigned to the Seq parameter provides a number sequence value that instructs the workload manager 111 when processing a request 112 to attempt to connect to the foreign servers listed in the LINK definition in a specific sequential order.

Under option 1, if the first server "TD1" (value assigned to the "ServerName" variable in the LINK definition) is capable of being connected to during request 112 processing, then the workload manager 111 connects to TD1 to access the needed foreign table/object necessary to satisfy the virtual query portion of the request 112. However, if TD1 is unavailable (for any reason), the workload manager 111 attempts to connect to TD1BCP, if that server is available it is used to access the needed foreign table/object. If TD1BCP is unavailable, the workload manager 111 attempts to access the foreign table/object using server TD3Cold. This order of connection attempts is provided through the Seq parameter.

Under option 2, the workload manager 111 may also connect to each available foreign server defined in the LINK definition and obtain usage information through API 121 from the external data engine environment. The foreign server that returns the lowest CPU usage is then selected by the workload manager 111 as the server that will be used to satisfy the virtual query portion of the request 112. Once a lowest CPU usage is selected, the connections to the other foreign servers that were capable of being established are closed.

Under option 3, the workload manager 111 interacts with the remote/external/foreign workload manager 125 (when available) and obtains external data engine stats 124 for costing processing of the virtual query portion of the request 112 within each available foreign sever (external data engine environment 120). Some information evaluated when selecting the optimal foreign server can include current ruleset, throttles, and potentially if virtual query requests are blocked. The foreign server that returns the most favorable workload settings will be selected as the foreign server to access foreign table/object data. Connections to other foreign servers will be closed, and the query/request 111 execution will proceed normally to request foreign table/object data from the selected foreign server.

Any of the three mentioned options may be set as the default for any given CREATE FOREIGN SERVER DDL statement. A defaulted and processed option by the workload manager 111 may also be overridden during request 111 execution time (while the request 111 is being actively processed). Moreover, each option may also exclude selection of a foreign server based on data quality or data freshness filters. Further, the additional data quality or data freshness filters may be used with the dynamic and real-time override processing.

Query/Request 111 overrides can be specified at the session level through a SET FOREIGN SEVER ATTR (attribute) on the session or at the SQL (DML) level via further new and enhanced SQL (DML) syntax. Any SQL level overrides supersede any session level overrides.

An example new SQL syntax for a session override that includes selection criteria for available resources of the foreign server and data freshness for data that is only 1 day old or less may appear as follows:

SET FOREIGN SERVER ATTR=
'SERVERNAME=OG_FS_With_Mutt_Routes;
   Route_Alg=Resource;F  S_Data_Qual=24H' FOR SESSION VOLATILE;
SELECT * FROM
ProdSales.DLY_TRAN©QG_FS_With_Mult_Routes;

The underlined portion of the above SQL statement (representing enhanced DML/SQL syntax) provides a run-time override instruction to the workload manager 111, the ROUTE_ALG parameter alerts the workload manager 111 to make the foreign server selection based on available resources (processing load or usage) based on the assigned "Resource" value. The FS_DATA_QUAL parameter alerts the workload manager 111 to also include a data quality or freshness filter to select only a foreign server with data values that are 1 day old or less based on the assigned value of "24H."

An example new SQL/DML syntax for dynamically overriding a session at the SQL/DML level to make selection based on external workload manager 125 settings and based on a data quality or freshness filter for data that is less than or equal to 7 days old may appear as follows:

SELECT * FROM
ProdSales.DLY_TRAN©QG_FS_With_Mult_Routes
   Using_QG_Override   (Route_Alq=TASM:FS_Data_Qual=7D';);

The underlined portion is new SQL/DML that is defined at the SQL level to override a session forcing the workload manager 111 to change selection criteria for selecting the foreign server based on detection of the USING_QG_OVERRIDE parameter, here the ROUTE_ALG is set to TASM, which instructs the workload manager 111 to select the foreign server based on external workload manager 125 settings and to select based on a FS_DATA_QUAL value of "7D" (data that is no more than 7 days old).

The data quality/freshness filters illustrate Data Currency (or freshness) of the data; however, other options that employ customized-data filtering, during the workload-foreign-server selection process, can be used. For example, the virtual/foreign table/object data on a given foreign server may be up-to-date, or possibly a day or a week old, depending on the ecosystem site's update policy. The Data Currency defaults to current or up-to-date and is overridden when a 'looser' quality of data option is specified at query 112 execution time. A user may specify at query run time if access to non-current data is acceptable. The API 121 mechanism provided on the Foreign Server (external data engine environment 120) for the connection handshake may also provide currency information for the target virtual/foreign table/object. When determining the foreign server to access, connections to available foreign servers that do not meet the 'quality of data' are not considered successful in the routing option algorithms described above.

The system 100 enhances a workload manager 111 of a local data environment to recognize and process virtual queries embedded in queries/requests 112 based on the original DDL for the CREATE FOREIGN SERVER having a new extended LINK definition that supports adding multiple foreign servers that are known to have the data needed for the virtual queries. Conventionally, just one foreign server was available, the new approached allows for failover processing to ensure the original queries 112 do not fail and provides optimization for selecting an optimal foreign server to service a given virtual query. The selection process of the foreign server can also be based on different customizable conditions (first available, usage load, workload settings) and data quality or freshness conditions. Still further, a default selection process can be overridden at a session level for the query 112 or at the SQL level through new SQL/DML syntax that instructs the workload manager 111 to perform the overrides.

Figure 2:
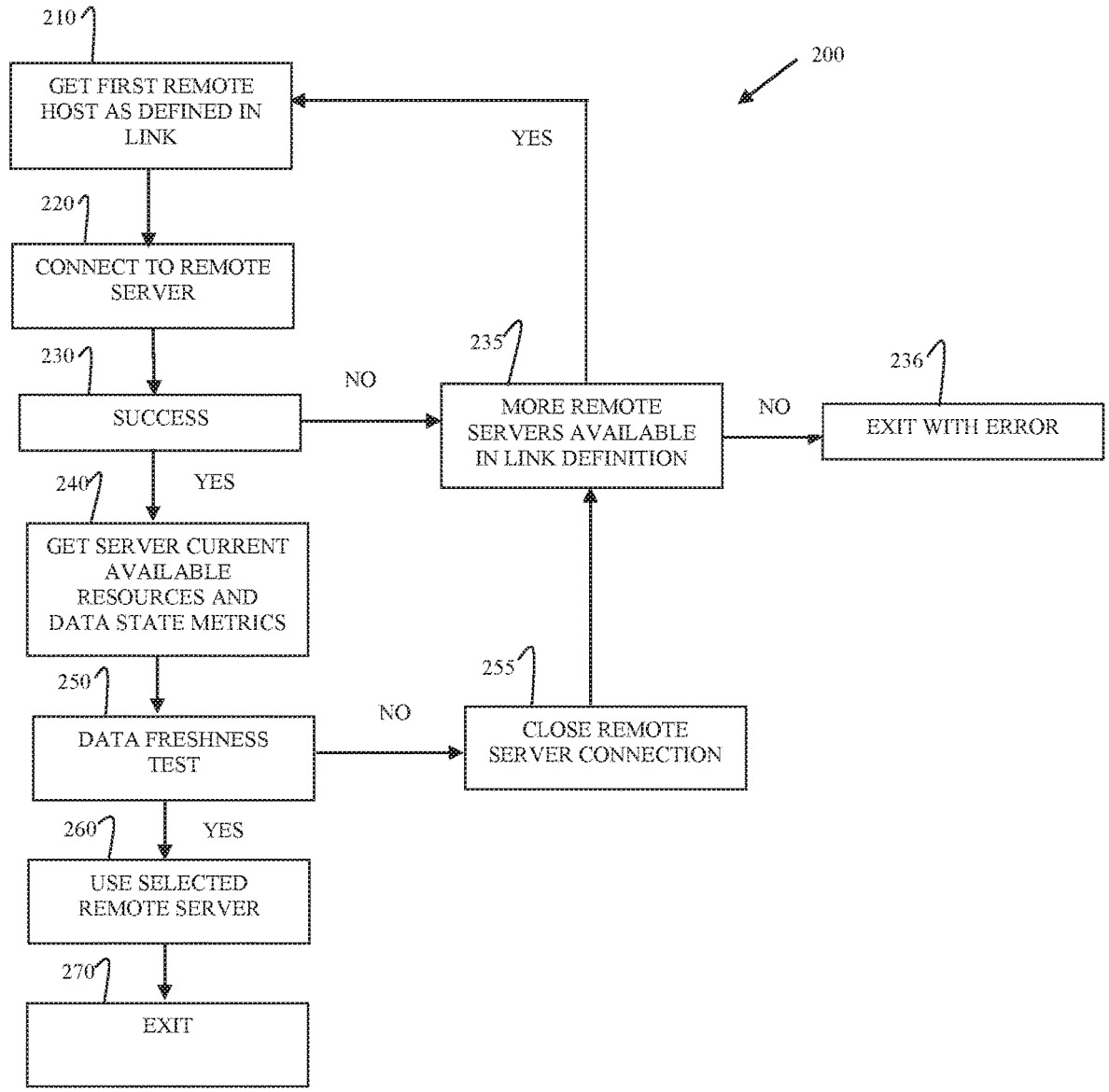
FIG. 2 is a diagram of a method for determining alternative external servers when a primary external server fails for a virtual query portion of a query, according to an example embodiment.

FIG. 2 is a diagram of a method 200 for determining alternative external/foreign servers when a primary external/foreign server fails for a virtual query portion of a query/request 112, according to an example embodiment.

The FIG. 2 represents option 1 discussed above, where the workload manager 111 of the local data environment 110 selects the foreign server based on the first foreign server that can be successfully connected to in the order list provided in the enhanced SQL LINK definition of the CREATE FOREIGN SERVER DDL statement. FIG. 2 also includes a data quality or freshness condition that is evaluated by the workload manager 111 during the selection process.

At 210, the workload manager 111, identifies the first foreign server provided in the LINK definition of the CREATE FOREIGN SERVER DDL statement. This is the first server having the SEQ value set to 1 (as discussed above).

At 220, the workload manager 111, attempts to connect to the remote/foreign server.

At 230, the workload manager 111, checks to see whether the connection was successful or not.

At 235, the workload manager 111, determines the connection was not successful and which point, the workload manager 111 increments the SEQ value by 1 and looks for additional remote/foreign servers defined in the LINK definition.

At 236, the workload manager 111, determines that there are no more available remote/foreign servers in the LINK definition, such that no remote servers are available to service the virtual query and the query 112 fails to process successfully.

At 240, the workload manager 111, determines that a connection to a remote server was successful, as a result the workload manager 111 obtains available resources and data state metrics for the foreign/remote server.

At 250, the workload manager 111, evaluates the data freshness conditions based on the returned data state metrics.

At 255, the workload manager 111, determines that the data freshness conditions were unable to be satisfied. As a result, the connection to the remote/foreign server is closed and processing continues at 235 (as discussed above).

At 260, the workload manager 111, determines that the data freshness conditions were satisfied and selects the current connected to remote/foreign server to process the virtual query portion of the query/request 112.

At 270, the workload manager 111, exits processing for the virtual query portion of the request/query 112 since the appropriate foreign/remote server was selected.

It is noted that this option selects the first available (online) foreign server that is capable of being connected to and that also meets the data freshness conditions.

Also, the processing conditions can be overridden at the session level or the SQL level as was discussed above with the FIG. 1, such that the selection criteria at 250 can be changed or a new condition added that alters the approach of just select the first that meets the existing data freshness test.

Figure 3:
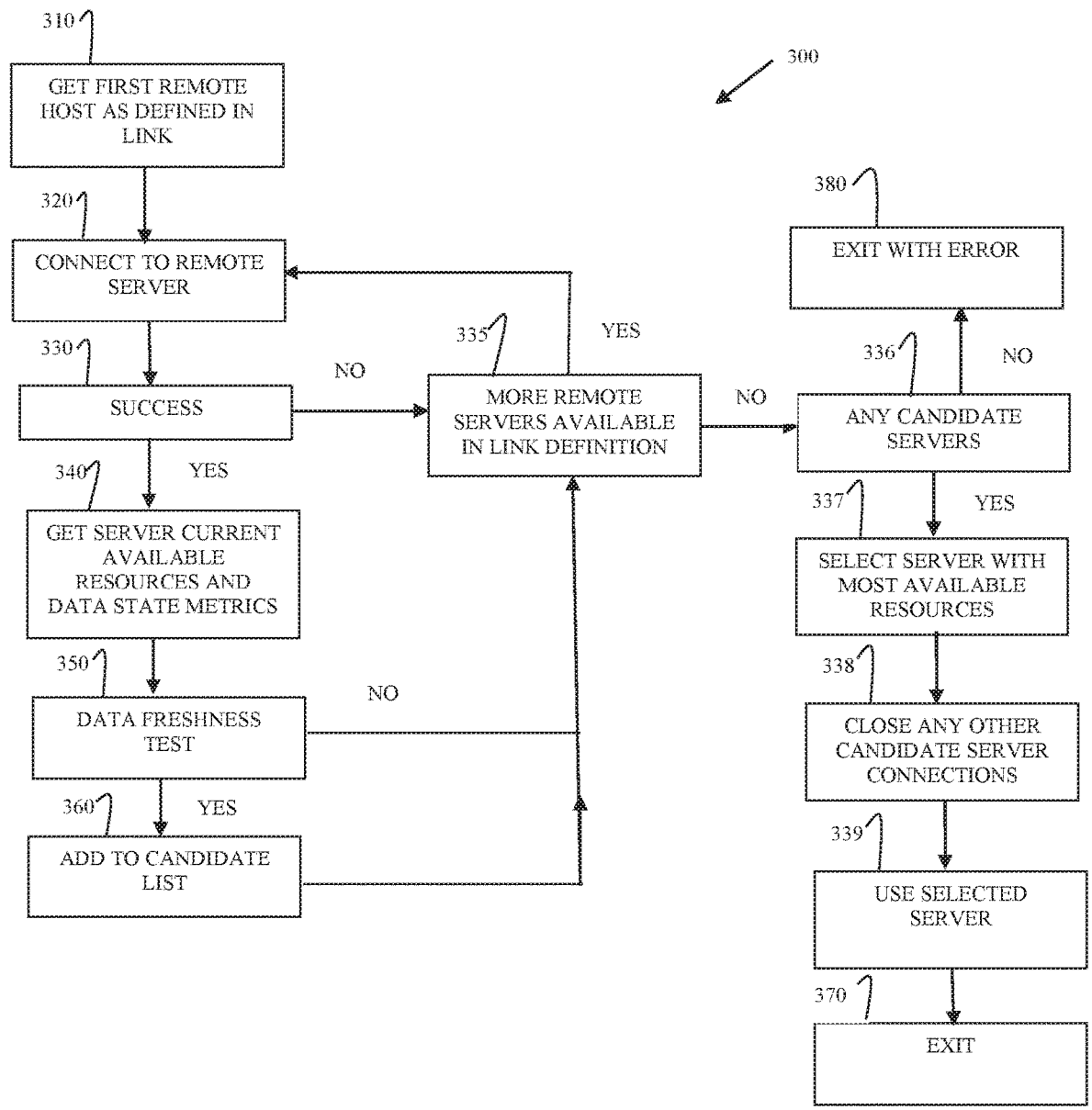
FIG. 3 is a diagram of a method for selecting one of a plurality of multiple available external servers when a primary external server fails for a virtual query portion of a query, according to an example embodiment.

FIG. 3 is a diagram of a method 300 for selecting one of a plurality of multiple available external/remote/foreign servers when a primary external server fails for a virtual query portion of a query/request 112, according to an example embodiment.

The FIG. 3 represents option 2 discussed above with the FIG. 1. The processing is performed by the workload manager 111 when a request/query 112 includes a virtual query portion that requires access to a remote/foreign/virtual table/object of an external/foreign/remote data environment 120. Again, the workload manager 111 is responsive to the new and enhanced DML/SQL present in the CREATE FOREIGN SERVER DDL statement or provided as overrides on the session at the session level or the SQL level as discussed above with the FIG. 1.

At 310, the workload manager 111, obtains the first foreign server identified with a SEQ value of 1 in the enhanced LINK definition for the CREATE FOREIGN SERVER DDL statement.

At 320, the workload manager 111, attempts to connect to that server.

At 330, the workload manager 111 checks the connection to see whether the attempt at 320 was successful or not.

Assuming the connection was unsuccessful, at 335, the workload manager 111 increments the SEQ count by one and looks to see if there are any more servers for processing in the LINK definition. Assuming there are no other servers available, at 336, the workload manager 111 checks to see if there are any candidate servers that were successfully connected to and met the processing to be added to the candidate server list (discussed below at 340-360).

If there was no candidate server for connecting to, at 380, the workload manager 111 exits with an error and the virtual query portion of the request/query 112 is unable to be processed. As a result, the request/query 112 fails.

Assuming, there are candidate servers in the list that is being maintained, at 337, the workload manager 111 selects the server as the server with the most available resources to service the virtual query portion of the request/query 112. At 338, the workload manager 111 closes all open connections to any other candidate server in the list and retains the connection to the selected server. At 339, the selected server is used by the workload manager 111 to process the virtual query portion of the request/query 112. At 370, the workload manager 111 exits and continues processing other aspects of the query/request 112 that may be needed with the virtual query portion having been satisfied.

At 340, the workload manager 111, has identified a successful connection to a candidate server and obtains the available resources and data state metrics.

At 350, the workload manager 111, performs the data freshness evaluation on the data state metrics. If this fails, the workload manager 111, continues processing back at 335 (as discussed above).

Assuming, at 360, the data freshness test passes, the workload manager 111 adds the candidate server with an open connection to the candidate list and resumes processing back at 335 for any next available server from the LINK definition.

The selection processing can be overridden at runtime by the above-referenced overrides performed at the session level or the SQL level (as discussed with the FIG. 1).

Figure 4:
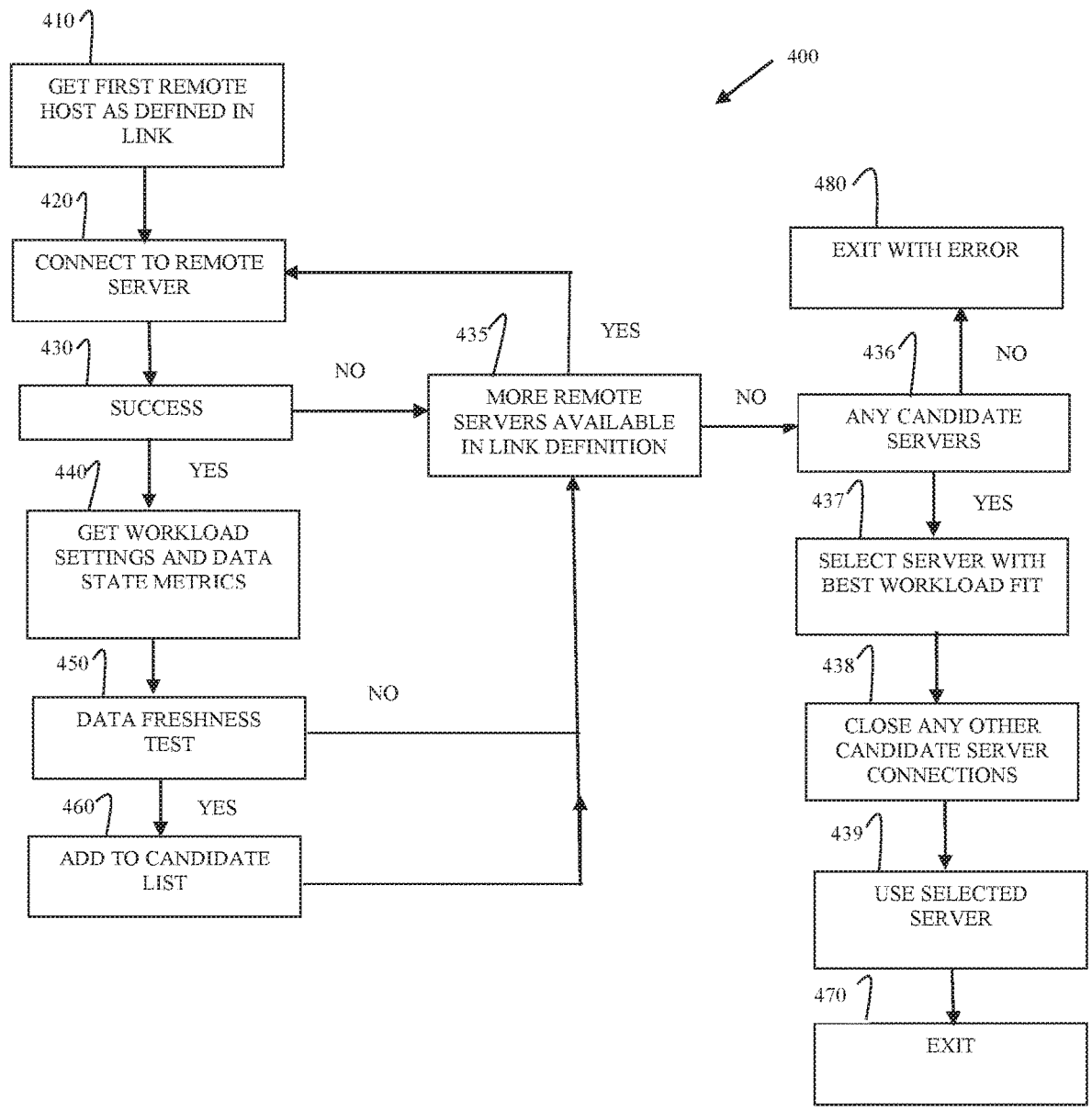
FIG. 4 is a diagram of a method for selecting one of a plurality of multiple available external servers when a primary external server fails for a virtual query portion of a query and where the external servers include a workload manager, according to an example embodiment.

FIG. 4 is a diagram of a method 400 for selecting one of a plurality of multiple available external servers when a primary external server fails for a virtual query portion of a query and where the external servers include a workload manager 125, according to an example embodiment.

The FIG. 4 represents selection processing of the workload manager 111 for option 3 discussed above with the FIG. 1, Again, the processing is driven by the new and enhanced SQL and is initially processed based on a given request/query 112 having an extended LINK definition in a CREATE FOREIGN SERVER DDL statement when the request/query 112 includes a virtual query portion that requires access to an external/remote/foreign table/object within an external/foreign/remote data environment 120. The processing is performed by the workload manager 111.

At 410, the workload manager 111, obtains the first foreign server identified by the SEQ value of 1 in the extended LINK definition for the CREATE FOREIGN SERVER DDL.

At 420, the workload manager 111, attempts to connect to the first server from the list of available servers in the extended LINK definition.

At 430, the workload manager 111, checks to see whether the connection was successful or not.

Assuming the connection was unsuccessful, at 435, the workload manager 111 increments the SEQ value and checks to see if there are any remaining servers in the list for the extended LINK definition.

Assuming there are no more servers to check, at 436, the workload manager 111 checks to see if there are any candidate servers that were identified (1 or more servers). If there are no candidate servers, the workload manager 111 exits at 480 and the request/query 112 fails because the virtual query portion of the request/query 112 cannot be satisfied.

Assuming there are 1 or more candidate servers, at 437, the workload manager 111 selects the server from the list with the best workload fit based on workload settings returned from the external/foreign workload manager 125. At 438, all the other remaining open server connections are closed. The remaining open server connection to the selected server, at 439, is then used to service the virtual query portion of the request/query 112. At 470, the workload manager 111 exits and continues processing any remaining portion of the request/query 112 that may be needed with the virtual query portion having been satisfied.

At 440, the workload manager 111, obtains the workload settings and data state metrics from the server connection that is being processed (obtained from that server's workload manager 125).

At 450, the workload manager 111 performs the data freshness test/evaluation. If this fails for the current server connection, then processing resumes back at 435.

Assuming the data freshness test passes, at 460, the workload manager 111 adds the current server to the candidate list, keeps that server connection open, and resumes processing back at 435 to evaluate any remaining servers identified in the extended LINK definition.

Again, the selection processing (including the data freshness conditions) can be dynamically overridden during request/query 112 processing at the session level or at the SQL level as discussed above with the FIG. 1.

These and other embodiments will now be discussed with reference to the FIGS. 5-7.

Figure 5:
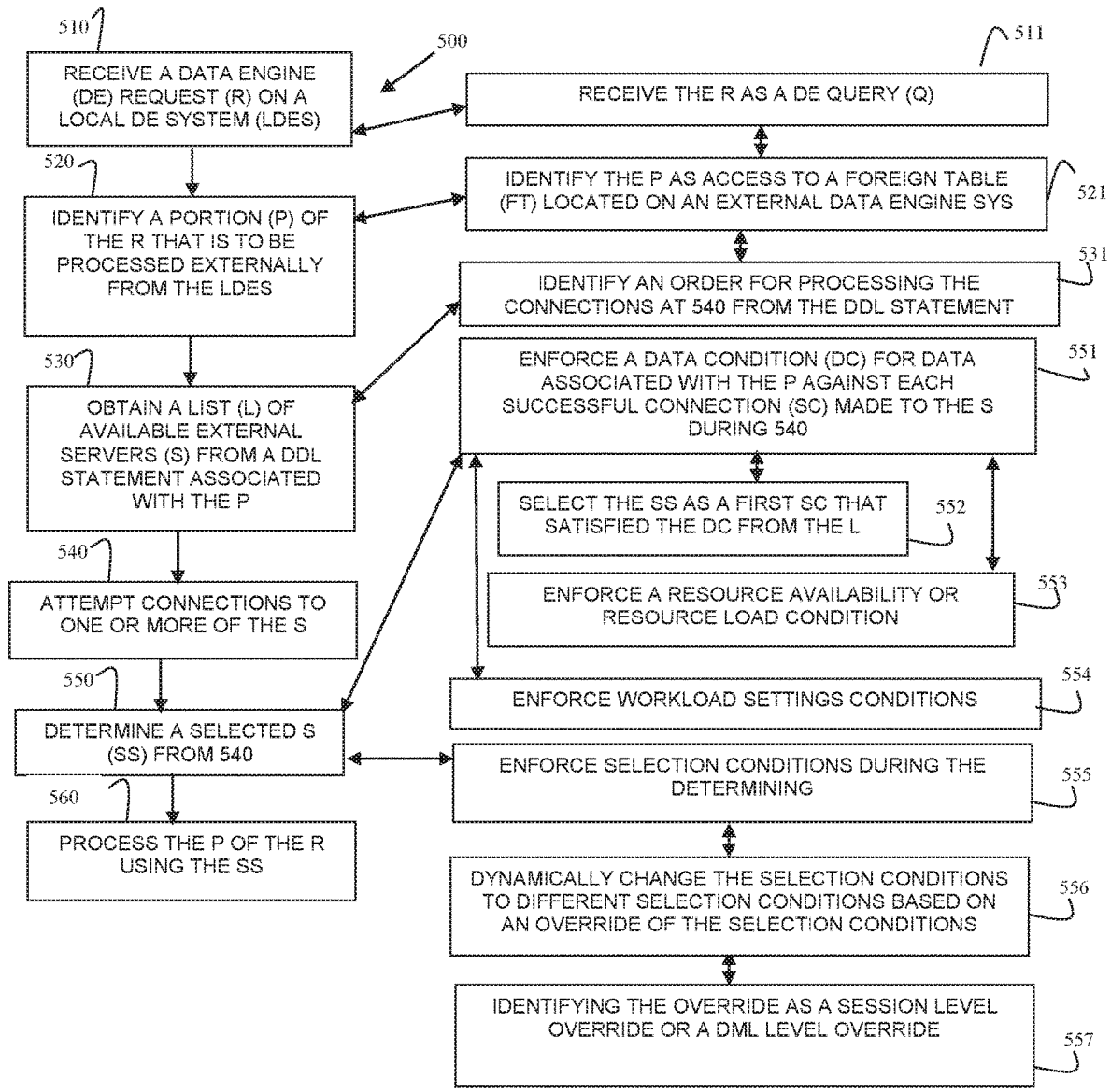
FIG. 5 is a diagram of a method for virtual query routing, according to an example embodiment.

FIG. 5 is a diagram of a method 500 for virtual query routing, according to an example embodiment. The method 500 is implemented as one or more software modules referred to as a "workload query router"). The workload query router represents executable instructions that are programmed within memory or a non-transitory computer-readable medium and executed by one or more hardware processors of a device. The workload query router may have access to one or more network connections during processing, which can be wired, wireless, or a combination of wired and wireless.

In an embodiment, the workload query router executes on devices of a data warehouse across one or more physical devices or nodes (computing devices) for execution over one or more network connections.

In an embodiment, the workload query router is all of or some combination of: the workload request manager 111, the method 200, the method 300, and/or the method 400.

At 510, the workload query router receives a data engine request 112 on a local data engine system 110.

In an embodiment, at 511, the workload query router receives the request 112 as a data engine query 112.

At 520, the workload query router identifies a portion of the request 112 that is to be externally processed from the local data engine system 110.

In an embodiment of 511 and 520, at 521, the workload query router identifies the portion as an access that is needed to a foreign table located on an external data engine system 120.

At 530, the workload query router obtains a list of available external servers from a DDL statement associated with the portion. In an embodiment the DDL statement is an SQL CREATE FOREIGN SERVER DDL statement that is enhanced with an extend LINK definition that permits multiple (greater than 1) foreign server to be defined and permits an order to evaluate each of the foreign servers (this was discussed at length above with the FIGS. 1-4).

In an embodiment of 521 and 530, at 531, the workload query router identifies an order for processing the connections from the DDL statement.

At 540, the workload query router attempts connections to one or more of the external servers.

At 550, the workload query router determines a selected external server from 540.

In an embodiment, at 551, the workload query router enforces a data condition for data associated with the portion of the request 112 against each successful connection made to the external servers at 540.

In an embodiment of 551 and at 552, the workload query router selects the selected external server as a first successful connection that satisfied the data condition from the list. This was described as option 1 and illustrated in the FIG. 2 above.

In an embodiment of 551 and at 553, the workload query router enforces a resource availability or resource load condition on the successful connections to determine the selected external server. This was described as option 2 and illustrated in the FIG. 3 above.

In an embodiment and at 554, the workload query router enforces workload settings conditions on the successful connections to determine the selected external server. This was described as option 3 and illustrated in the FIG. 4 above.

In an embodiment, at 555, the workload query router enforces selection conditions during the determination of the selected external server. This can be any of the data quality or freshness conditions, the usage conditions, the resource availability conditions, and/or the workload settings conditions as discussed above with the FIGS. 1-4 and options 1-3.

In an embodiment of 555 and at 556, the workload query router dynamically changes the selection conditions to different selection conditions based on an override of the selection conditions.

In an embodiment of 556 and at 557, the workload query router identifies the override as a session level override or a DML (e.g., SQL) level override. These overrides and their new DML syntax were discussed above with the FIGS. 1-4.

At 560, the workload query router processes the portion of the request 112 using the selected external server by routing that portion to the selected external server during the processing of the request 112.

Figure 6:
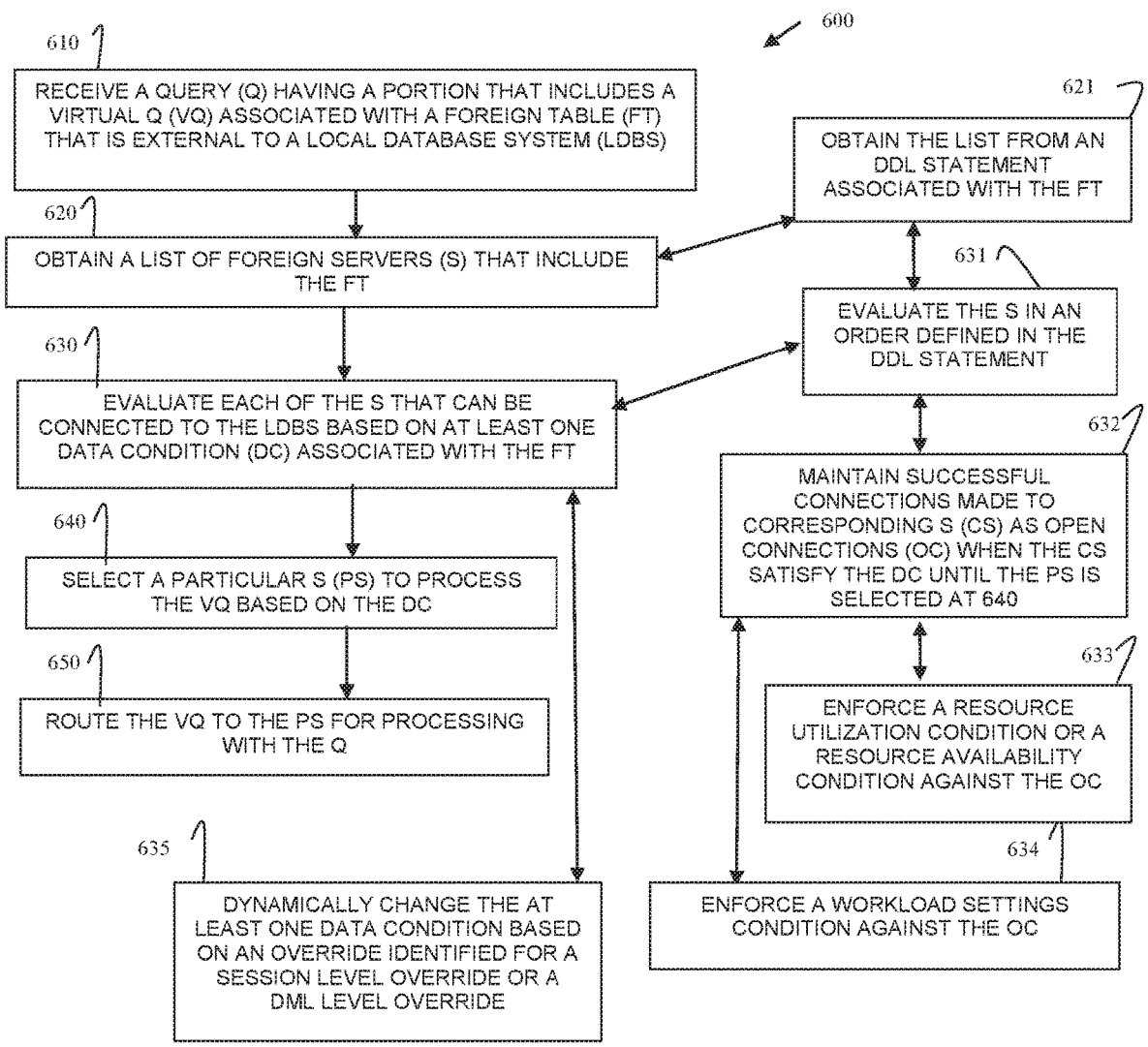
FIG. 6 is a diagram of another method for virtual query routing, according to an example embodiment.

FIG. 6 is a diagram of another method 600 for virtual query routing, according to an example embodiment. The method 600 is implemented as one or more software modules referred to as a "virtual query router." The virtual query router represents executable instructions that are programmed within memory or a non-transitory computer-readable medium and executed by one or more hardware processors of a device. The virtual query router may have access to one or more network connections during processing, which can be wired, wireless, or a combination of wired and wireless.

The processing depicted for the virtual query router in the FIG. 6 presents another and, in some ways, enhanced perspective of the processing discussed above with the FIG. 5.

In an embodiment, the virtual query router is all or some combination of: the workload manager 111, the method 200, the method 300, the method 400, and/or the method 500.

At 610, the virtual query router receives a query 112 having a portion that includes a virtual query associated with a foreign table that is external to a local database system 110. The query 112 originates and is being processed from the local database system 110.

At 620, the virtual query router obtains a list of foreign servers that include the foreign table and correspondingly the data that the virtual query is to be processed against.

In an embodiment, at 621, the virtual query router obtains the list from a DDL statement associated with the foreign table. In an embodiment, the DDL statement is the CREATE FOREIGN SERVER DDL statement syntax that was discussed above for SQL and that includes an extended LINK definition that permits greater than 1 foreign server to be defined for a single foreign server DDL statement.

At 630, the virtual query router evaluates each of the foreign servers that can be connected to the local database system 110 based on at least one data condition associated with the foreign table. The at least one data condition is the data quality or data freshness conditions discussed above with the FIGS. 1-5.

In an embodiment of 630 and at 621, at 631, the virtual query router evaluates the foreign servers from the list in an order defined in the DDL statement. In an embodiment, this is in a syntax similar to or the same as what was discussed above for the SEQ parameter on the extended LINK definition.

In an embodiment of 631 and at 632, the virtual query router maintains successful connections made to corresponding foreign severs as open connections when the corresponding foreign servers satisfy the data condition until the particular selected foreign server is determined at 640 at which point those open connections are closed.

In an embodiment of 632 and at 633, the virtual query router enforces a resource utilization condition or a resource availability condition against the open connections before making the selection to the particular foreign server. This was discussed as option 2 above and illustrated in the FIG. 3.

In an embodiment of 632 and at 634, the virtual query router enforces a workload settings condition against the open connections before making the selection to the particular foreign server. This was discussed as option 3 above and illustrated in the FIG. 4.

In an embodiment, at 635, the virtual query router dynamically changes the at least one data condition based on an override identified for a session level override or a DML (e.g., SQL) level override. The syntax associated with this and the processing was discussed above with the FIGS. 1-4.

At 640, the virtual query router selects a particular foreign server to process the virtual query portion of the query 112 based on at least the data condition evaluated at 630.

At 650, the virtual query router routes the virtual query to the selected particular foreign server for processing with the query 112.

Figure 7:
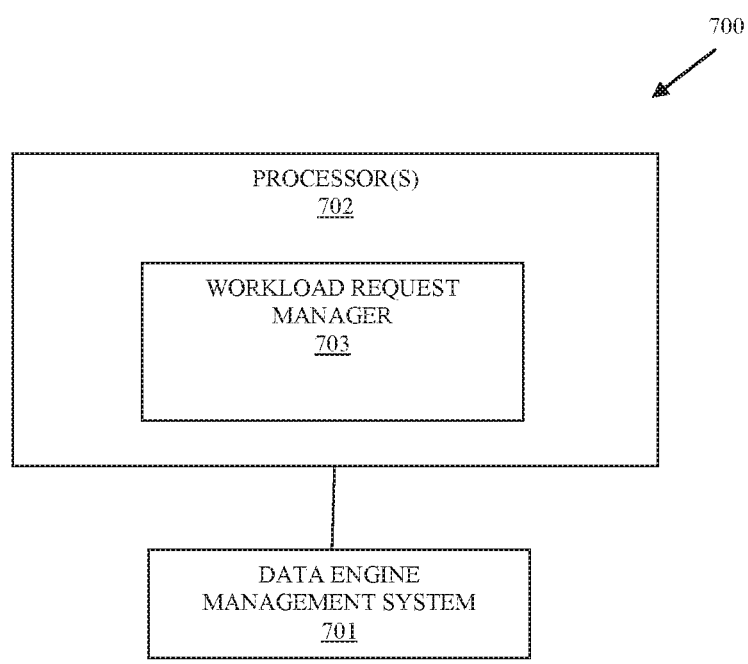
FIG. 7 is a diagram of another system for virtual query routing, according to an example embodiment.

FIG. 7 is a diagram of another system 700 for virtual query routing, according to an example embodiment. The system 700 includes a variety of hardware components and software components. The software components are programmed as executable instructions into memory and/or a non-transitory computer-readable medium for execution on the hardware components (hardware processors). The system 700 includes one or more network connections; the networks can be wired, wireless, or a combination of wired and wireless.

The system 700 implements, inter alia, the processing discussed above with the FIGS. 1-6.

The system 700 includes: a DBMS 701, at least one hardware processor 702 and a non-transitory computer-readable storage medium having executable instructions representing a workload request manager 703.

The workload request manager 703 when executed on at least one hardware processor 702 from the non-transitory computer-readable storage medium causes the processor to: 1) evaluate a list of foreign servers that can satisfy a virtual query portion of a query that is being processed by the DBMS 701; 2) select an optimal foreign server based on conditions evaluated for each foreign server that the DBMS 701 was able to connect to; 3) close open connections to non-selected foreign servers once the optimal foreign server is selected; and 4) route the virtual query to the optimal foreign server using a remaining open connection to the optimal foreign server during the query processing from the DBMS 701.

In an embodiment, the workload request manager 703 is further configured to cause the processor to: dynamically change the conditions based on detected overrides received during the query processing on the DBMS 701.

In an embodiment, the workload request manager 703 is all or some combination of: the workload request manager 111, the method 200, the method 300, the method 400, the method 500, and/or the method 600.

In an embodiment, the DBMS 701 is processed within the local data environment 110.

One now fully appreciates how virtual queries can be processed with failover support in real time and/or processed for purposes of optimizing virtual query performance. Previously, virtual queries and their corresponding parent queries would fail when their defined foreign table was unavailable for any reason. With the approaches herein, utilizing the enhanced LINK definition, a list of foreign servers can be defined for a single foreign table DDL statement. Moreover, the techniques provide for data freshness conditions to be evaluated, resource utilization and availability conditions to be evaluated, and workload settings conditions to be evaluated. Still further, the conditions can be dynamically overridden with the new DML (SQL) syntax described above and the overrides can occur at the session level or at the SQL level.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A data engine management system comprising:
at least one hardware processor; and
a non-transitory computer-readable storage medium having executable instructions representing a workload request manager, wherein the instructions are executable on the at least one hardware processor to cause the at least one hardware processor to:
receive a data engine query on a local data engine system;
identify a portion of the data engine query that is to be processed externally from the local data engine system;
obtain a list of external servers from a Data Definition Language (DDL) statement associated with the portion, wherein the list identifies each external server available to execute the portion of the data engine query;
attempt connections from the local data engine system to one or more of the external servers;
select at least one of the external servers to be connected to the local data engine system in response to the attempting, wherein the selecting is based on availability of the at least one of the external servers, at least one condition imposed on the external servers, and at least a portion of data from the one or more of the external servers having a data freshness level above a predetermined data freshness threshold;
connect the at least one selected external server; and
process the portion of the data engine query using the at least one connected selected external server.

2. The data engine management system of claim 1, wherein the instructions are further executable on the at least one hardware processor to cause the at least one hardware processor to further identify the portion of the data engine query as requiring access to a foreign table located on an external data engine system.

3. The data engine management system of claim 2, wherein the instructions are further executable on the at least one hardware processor to cause the at least one hardware processor to identify an order for attempting the connections to the external servers during the attempting from the Data Definition Language (DDL) statement.

4. The data engine management system of claim 1, wherein the instructions are further executable on the at least one hardware processor to cause the at least one hardware processor to select the one of the external servers as a first successful connection that satisfied having at least a portion of data having a data freshness level above a predetermined data freshness threshold from the list.

5. The data engine management system of claim 1, wherein-the instructions are further executable on the at least one hardware processor to cause the at least one hardware processor to enforce a resource availability or resource load condition of the external server against each successful connection made to the external servers during the selecting.

6. The data engine management system of claim 1, wherein the instructions are further executable on the at least one hardware processor to cause the at least one hardware processor to enforce workload settings conditions of the external server against each successful connection made to the external servers during the selecting.

7. The data engine management system of claim 1, wherein the selecting, with the processor, further includes enforcing, with the processor, selection conditions during the selecting, wherein the selection conditions are associated with selection of the at least one external server.

8. The data engine management system of claim 7, wherein the instructions are further executable on the at least one hardware processor to cause the at least one hardware processor to dynamically change the selection conditions to different selection conditions based on an override of the selection conditions.

9. The data engine management system of claim 8, wherein the instructions are further executable on the at least one hardware processor to cause the at least one hardware processor to identify the override of the selection conditions as a session level override or a Data Manipulation Language (DML) level override.

10. A data engine management system comprising:
 at least one hardware processor; and
 a non-transitory computer-readable storage medium having executable instructions representing a workload request manager, wherein the instructions are executable on the at least one hardware processor to cause the at least one hardware processor to:
 receive a query having a portion that includes a virtual query associated with a foreign table that is external to a local database system;
 obtain a list of foreign servers that include the foreign table, wherein the list identifies each foreign server capable of executing the virtual query;
 evaluate each of the foreign servers that can be connected to local database system based on at least one condition associated with the foreign table;
 select a particular foreign server to process the virtual query based on the evaluation, wherein the selecting is based on availability of the foreign servers, at least one condition imposed on the foreign servers, and at least a portion of data from the one or more of the external servers having a data freshness level above a predetermined data freshness threshold;
 connect the at least one selected external server to the local database system; and
 route the virtual query to the particular foreign server for processing with the query.

11. The data engine management system of claim 10, wherein the instructions are further executable on the at least one hardware processor to cause the at least one hardware processor to obtain the list from a Data Definition Language (DDL) Statement associated with the foreign table.

12. The data engine management system of claim 11, wherein the instructions are further executable on the at least one hardware processor to cause the at least one hardware processor to evaluate the foreign servers in an order defined in the Data Definition Language (DDL) Statement.

13. The data engine management system of claim 10, wherein the instructions are further executable on the at least one hardware processor to cause the at least one hardware processor to enforce a resource utilization condition or a resource availability condition against the open connections.

14. The data engine management system of claim 10, wherein the instructions are further executable on the at least one hardware processor to cause the at least one hardware processor to enforce a workload settings condition against the open connections.

15. The data engine management system of claim 10, wherein the instructions are further executable on the at least one hardware processor to cause the at least one hardware processor to dynamically change the at least one data condition based on an override identified for a session level override or a Data Manipulation Language level override.

16. A system, comprising:
 at least one hardware processor; and
 a non-transitory computer-readable storage medium having executable instructions representing a workload request manager, wherein the instructions are executable on the at least one hardware processor to cause the at least one hardware processor to:
 evaluate a predetermined list of foreign servers that can satisfy a virtual query portion of a query that is being processed by the data engine management system;
 connect to each of the foreign servers of the predetermined list;
 select an optimal foreign server from the predetermined list of foreign servers based on conditions evaluated for each foreign server that the data engine management system was able to connect to based on the evaluation;
 close open connections to non-selected foreign servers once the optimal foreign server is selected; and
 route the virtual query to the optimal foreign server using a remaining open connection to the optimal foreign server during the query processing from the data engine management system.

17. The system of claim 16, wherein the processor further configured to dynamically change the conditions based on detected overrides received during the query processing on the data engine management system.

* * * * *